(12) United States Patent
Kuo

(10) Patent No.: US 7,629,762 B2
(45) Date of Patent: Dec. 8, 2009

(54) MOTOR DRIVING CIRCUITS

(75) Inventor: Jung-Yen Kuo, Yunlin County (TW)

(73) Assignee: Princeton Technology Corporation, Taipei County (TW)

( * ) Notice: Subject to any disclaimer, the term of this patent is extended or adjusted under 35 U.S.C. 154(b) by 383 days.

(21) Appl. No.: 11/822,499

(22) Filed: Jul. 6, 2007

(65) Prior Publication Data

US 2008/0265820 A1    Oct. 30, 2008

(30) Foreign Application Priority Data

Apr. 24, 2007    (TW) .............................. 96114365 A

(51) Int. Cl.
*H02P 7/06*    (2006.01)
(52) U.S. Cl. .................. 318/504; 318/400.01; 318/696; 327/333; 327/134
(58) Field of Classification Search ............ 318/400.01, 318/696, 504; 327/333, 134
See application file for complete search history.

(56) References Cited

U.S. PATENT DOCUMENTS

| | | | | |
|---|---|---|---|---|
| 4,194,418 A | * | 3/1980 | Pechacek et al. ............ | 477/131 |
| 6,877,584 B2 | * | 4/2005 | Jonokuchi et al. ........... | 180/446 |
| 7,327,546 B2 | * | 2/2008 | Thiery ........................ | 361/100 |
| 7,342,447 B2 | * | 3/2008 | Zhao et al. .................. | 330/251 |
| 7,479,770 B2 | * | 1/2009 | Kohout et al. ............... | 323/271 |
| 7,508,255 B2 | * | 3/2009 | Furuichi et al. ............. | 327/543 |

* cited by examiner

*Primary Examiner*—Rita Leykin
(74) *Attorney, Agent, or Firm*—Muncy, Geissler Olds & Lowe, PLLC

(57) ABSTRACT

A motor driving circuit comprising first and second input voltage source sets, a reference voltage source, first and second voltage level shift units, a logic unit, and an output voltage terminal. The first input voltage source set provides a first input voltage set. The second input voltage source set provides a second input voltage set. The reference voltage source provides a reference voltage. The first voltage level shift unit raises part of levels of the first input voltage set to a level of the reference voltage. The second voltage level shift unit partially raises levels of the second input voltage set to a level of the reference voltage. The logic unit receives the reference voltage and the first input voltage set and outputs a control voltage. The output voltage terminal receives the control voltage and outputs an output voltage.

6 Claims, 2 Drawing Sheets

MOTOR DRIVING CIRCUITS

BACKGROUND OF THE INVENTION

1. Field of the Invention

The invention relates to a motor driving circuit, and more particularly to a motor driving circuit for a step motor.

2. Description of the Related Art

Typically, in a conventional step motor, an H bridge circuit drives the step motor to rotate in different directions and also to stop. As shown in FIG. 1, an H bridge circuit 1 comprises four metal oxide semiconductors (MOSs). The direction of rotation of a motor 15 is controlled by turning on the first MOS 11 and the third MOS 13 or turning on the second MOS 12 and the fourth MOS 14. Input of voltage is required at the MOS gates to turn each MOS on or off. Because a different voltage is required for turning on each MOS, a different output voltage circuit controls each MOS. Thus, the gate of each MOS is coupled to an output voltage. Voltages from the output voltage circuits control the H bridge circuit to drive a step motor.

Each output voltage circuit has an input voltage. If the input voltage is used to directly turn on a MOS, excessive power is consumed, degrading efficiency. An output voltage circuit is thus required to raise an input voltage to a sufficient level to turn on a MOS, thereby driving the H bridge circuit to operate.

Because a conventional H bridge circuit comprises four MOSs, a gate of each MOS is coupled to an output voltage circuit, and each MOS is turned on by a high level voltage output from the output voltage circuit; thus, a motor is driven. When one set of two MOS, or a MOS pair, is turned on, the other two MOS pairs are turned off. If the MOS pair to be turned off is not actually turned off, or if the output voltages are unstable due to leakage current, the H bridge circuit may operate incorrectly and in the wrong directions, and the motor may be damaged. Thus, an output voltage circuit capable of ameliorating the described disadvantages is desirable.

BRIEF SUMMARY OF THE INVENTION

Motor driving circuits are provided. An exemplary embodiment of a motor driving circuit comprises a first input voltage source set, a second input voltage source set, a reference voltage source, a first voltage level shift unit, a second voltage level shift unit, a logic unit, and an output voltage terminal. The first input voltage source set provides a first input voltage set. The second input voltage source set provides a second input voltage set. The reference voltage source provides a reference voltage. The first voltage level shift unit partially raises levels of the first input voltage set to a level of the reference voltage. The second voltage level shift unit partially raises levels of the second input voltage set to a level of the reference voltage. The logic unit receives the reference voltage and the first input voltage set and outputs a control voltage. The output voltage terminal receives the control voltage and outputs an output voltage.

The first input voltage set comprises a first input voltage source and a second input voltage source respectively inputting a first input voltage and a second input voltage. The second input voltage set comprises a third input voltage source and a fourth input voltage source respectively inputting a third input voltage and a fourth input voltage. The first input voltage and the second input voltage are inverted, and the third input voltage and the fourth input voltage are inverted.

In some embodiments, the level of the second input voltage is 0V when the level of the first input voltage is 5V, and the level of the second input voltage is 5V when the level of the first input voltage is 0V. The level of the fourth input voltage is 0V when the level of the third input voltage is 5V, and the level of the fourth input voltage is 5V when the level of the third input voltage is 0V.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 2:
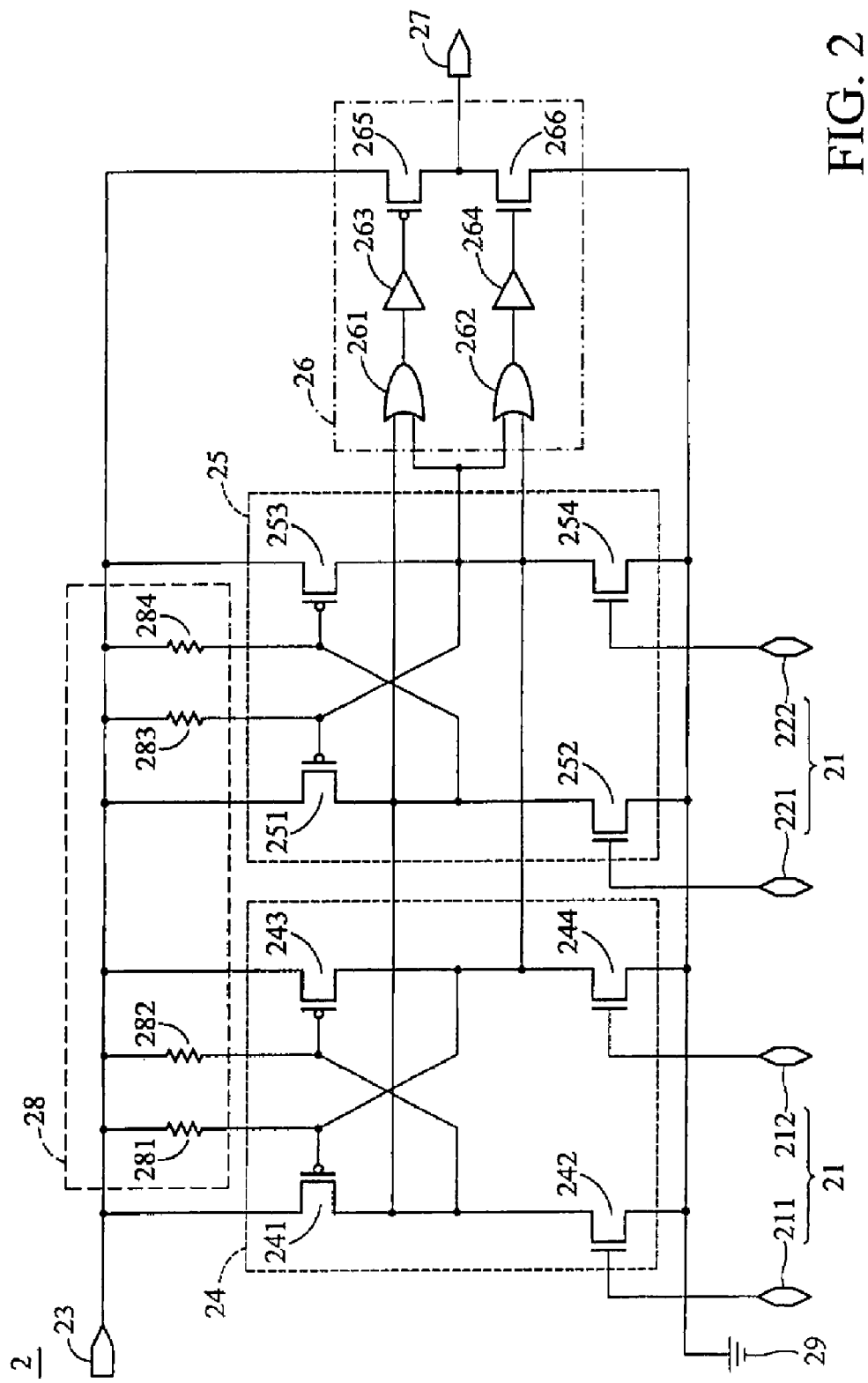
FIG. 2 shows an exemplary embodiment of a motor driving circuit.

Motor driving circuits are provided. In an exemplary embodiment of a motor driving circuit in FIG. 2, a motor driving circuit 2 comprises a first input voltage source set 21, a second input voltage source set 22, a reference voltage source 23, a first voltage level shift unit 24, a second voltage level shift unit 25, a logic unit 26, an output voltage source 27, a stabilizing unit 28, and a ground 29.

The first input voltage source set 21 comprises a first input voltage source 211 and a second input voltage source 212 respectively inputting a first input voltage and a second input voltage. The first and second input voltages are referred to a first input voltage set. The second input voltage source set 22 comprises a third input voltage source 221 and a fourth input voltage source 224 respectively inputting a third input voltage and a fourth input voltage. The third and fourth input voltages are referred to a second input voltage set. The levels of the first and second input voltage sets are 0V or 5V. The level of the first input voltage and the level of the second input voltage are inverted, and the level of the third input voltage and the level of the fourth input voltage are inverted. For example, when the level of the first input voltage is 5V, the level of the second input voltage is 0V, in contrary, when the level of the first input voltage is 0V, the level of the second input voltage is 5V. When the level of the third input voltage is 5V, the level of the fourth input voltage is 0V, in contrary, when the level of the third input voltage is 0V, the level of the fourth input voltage is 5V.

The reference voltage source 23 provides a reference voltage with a level of 13V. The reference voltage source 23 is coupled to one terminal of the first voltage level shift unit 24 and one terminal of the second voltage level shift unit 25. The other terminal of the first voltage level shift unit 24 is coupled to the first input voltage source set 21, and the other terminal of the second voltage level shift unit 25 is coupled to the second input voltage source set 22.

The first voltage level shift unit 24 comprises a first P-type metal oxide semiconductor (PMOS) 241, a first N-type metal oxide semiconductor (NMOS) 242, a second PMOS 243, and a second NMOS 244. The second voltage level shift unit 25 comprises a third PMOS 251, a third NMOS 252, a fourth PMOS 253, and a fourth NMOS 254. A source of the first PMOS 241 is coupled to the reference voltage source 23, and a drain thereof is coupled to a drain of the first NMOS 242. A source of the first NMOS 242 is coupled to the ground 29, and a gate thereof is coupled to the first input voltage source 211. A source of the second PMOS 243 is coupled to the reference voltage source 23, and a drain thereof is coupled to a drain of the second NMOS 244. A source of the second NMOS 244 is coupled to the ground 29, and a gate thereof is coupled to the second input voltage source 212. A source of the third PMOS 251 is coupled to the reference voltage source 23, and a drain thereof is coupled to a drain of the third NMOS 252. A source of the third NMOS 252 is coupled to the ground 29, and a gate thereof is coupled to the third input voltage source 221. A source of the fourth PMOS 253 is coupled to the reference voltage source 23, and a drain thereof is coupled to a drain of the fourth NMOS 254. A source of the fourth NMOS 254 is coupled to the ground 29, and a gate thereof is coupled to the fourth input voltage source 222.

Through the operations of the MOSs within the first and second voltage level shift units 24 and 25, the first voltage level shift unit 24 raises the voltage level of one of the first and second input voltage sources 211 and 212 in the first input voltage source set 21 to the level of the reference voltage source 23, and the second voltage level shift unit 25 raises the voltage level of one of the third and fourth input voltage sources 221 and 222 in the second input voltage source set 22 to the level of the reference voltage source 23

The logic unit 26 comprises a NOR gate 261, a NAND gate 262, a first inverter 263, a second inverter 264, a fifth PMOS 265, and an NMOS 266. An input terminal of the NOR gate 261 is coupled to the drains of the first PMOS 241, the first NMOS 242, the fourth PMOS 253, and the fourth NMOS 254, and an output terminal thereof is coupled to an input terminal of the first inverter 263. An input terminal of the NAND gate 262 is coupled to the drains of the second PMOS 243, the second NMOS 244, the fourth PMOS 253, and the fourth NMOS 254, and an output terminal thereof is coupled to an input terminal of the second inverter 264. An output terminal of the first inverter 263 is coupled to a gate of the fifth PMOS 265, and an output terminal of the second inverter 264 is coupled to a gate of the fifth NMOS 266. The logic unit 26 generates and outputs a control voltage according to the received voltages.

Figure 1:
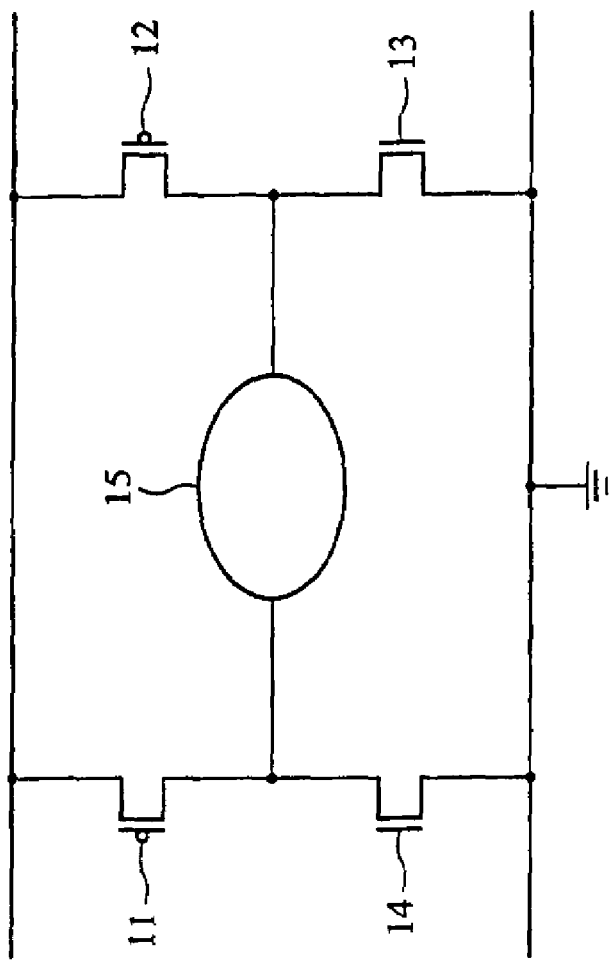
FIG. 1 shows a conventional H bridge circuit.

The output voltage source 27 is coupled to drains of the fifth PMOS 265 and the fifth NMOS 266. The output voltage source 27 receives and outputs the control voltage to turn the MOSs in the H bridge circuit of FIG. 1 on or off.

Typically, when the motor driving circuit 2 is supplied with power, the voltage at the input terminal of the logic unit 26 is unstable due to the sudden supplying. When the unstable voltage is too great, a voltage which is not predetermined passes through the logic unit. The voltage level shift circuit outputs an abnormal voltage, resulting in abnormal operation. The stabilizing unit 28 comprises a first resistor 281, a second resistor 282, a third resistor 283, and a fourth resistor 284. The first resistor 281 is coupled between the reference voltage source 23 and the gate of the first PMOS 241. The second resistor 282 is coupled between the reference voltage source 23 and the gate of the second PMOS 242. The third resistor 283 is coupled between the reference voltage source 23 and the gate of the third PMOS 251. The fourth resistor 284 is coupled between the reference voltage source 23 and the gate of the fifth PMOS 252. When the motor driving circuit 2 is supplied with power, the stabilizing unit 28 fixes the voltage at the input terminal of the logic unit 26 at the same voltage level as the reference voltage, preventing abnormal voltage levels and abnormal system operation due to leakage current.

According the foregoing description, the motor driving circuit can effectively drive a motor. The first input voltage source set 21 determines whether the motor driving circuit will operate. The voltage level shift units 24 and 25 raise an input voltage to the level of the reference voltage. The stabilizing unit 28 can prevent leakage current and unstable voltage level when the motor driving circuit is supplied. The motor driving circuit improves on the conventional technology.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A motor driving circuit comprising:
   a first input voltage source set providing a first input voltage set;
   a second input voltage source set providing a second input voltage set;
   a reference voltage source providing a reference voltage;
   a first voltage level shift unit partially raising levels of the first input voltage set to a level of the reference voltage;
   a second voltage level shift unit partially raising levels of the second input voltage set to a level of the reference voltage;
   a logic unit receiving the reference voltage and the first input voltage set and outputting a control voltage; and
   an output voltage terminal receiving the control voltage and outputting an output voltage.

2. The motor driving circuit as claimed in claim 1 further comprising a stabilizing unit preventing leakage resulted in the motor driving circuit and comprising a plurality of resistors coupled between the reference voltage source and the first and second voltage level shift units.

3. The motor driving circuit as claimed in claim 1, wherein the first input voltage source set comprises a first input voltage source and a second input voltage source respectively inputting a first input voltage and a second input voltage, the second input voltage source set comprises a third input voltage source and a fourth input voltage source respectively inputting a third input voltage and a fourth input voltage, the first input voltage and the second input voltage are inverted, and the third input voltage and the fourth input voltage are inverted.

4. The motor driving circuit as claimed in claim 3,
wherein levels of the first, second, third, and fourth input voltages are 0V or 5V;
wherein the level of the second input voltage is 0V when the level of the first input voltage is 5V, and the level of the second input voltage is 5V when the level of the first input voltage is 0V; and
wherein the level of the fourth input voltage is 0V when the level of the third input voltage is 5V, and the level of the fourth input voltage is 5V when the level of the third input voltage is 0V.

5. The motor driving circuit as claimed in claim 1,
wherein the first voltage level shift unit comprises a first P-type metal oxide semiconductor (PMOS), a first N-type metal oxide semiconductor (NMOS), a second PMOS, and a second NMOS; and
wherein the second voltage level shift unit comprises a third PMOS, a third NMOS, a fourth PMOS, and a fourth NMOS.

6. The motor driving circuit as claimed in claim 1, wherein the logic unit comprises a NOR gate, a NAND gate, and a plurality of inverters.

* * * * *